United States Patent Office 2,816,570
Patented Dec. 17, 1957

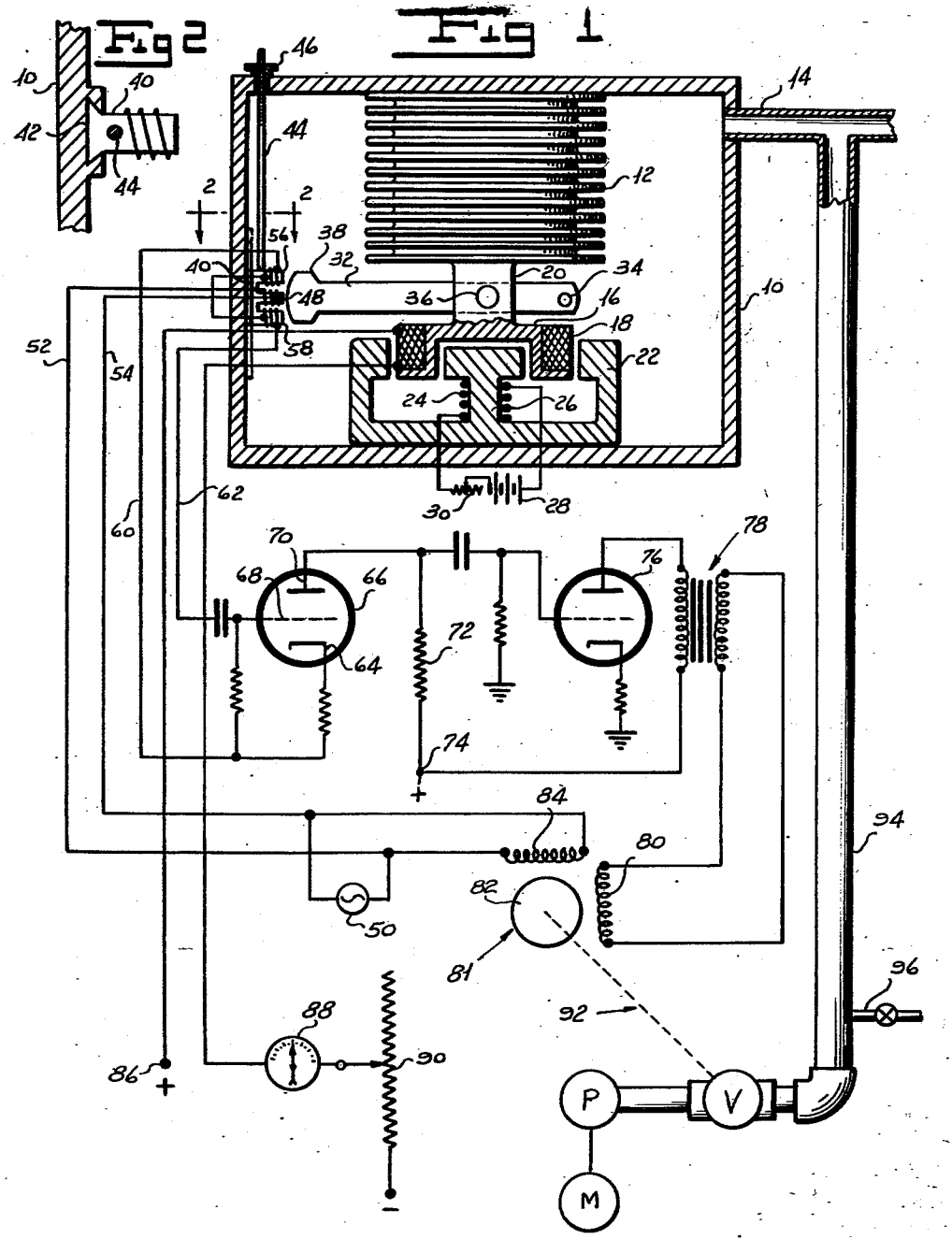

2,816,570
MANOSTAT

William C. Coulbourn, Roslyn Heights, and Herbert J. Sandberg, New York, N. Y., assignors, by mesne assignments, to Norden-Ketay Corporation, a corporation of Illinois Application February 2, 1953, Serial No. 334,536

10 Claims. (Cl. 137—487.5)

Our invention relates to a manostat for maintaining a pressure system at a predetermined pressure and more particularly to a manostat providing an extremely accurate means for controlling pressure.

Manostats in general are devices wherein the force exerted by the pressure to be controlled is balanced against a preset force. When deviations in pressure occur, the balance is disturbed and a correction is initiated whereby the controlled pressure is returned to the desired value. A spring is one means used to provide the balancing force. The spring is set to an initial tension corresponding to the desired pressure, and deviations in pressure displace the spring from its preset position to initiate a correction. Springs, however, are notoriously nonlinear devices, and deviations in pressure cause the spring to initiate corrections which may be more or less than the desired amount due to the nonlinear characteristic. We have conceived the improvement of balancing the force exerted by the pressure in the system against the force exerted by the electromagnetic pull of a winding through which is passed a current which will cause the winding to exert a balancing force corresponding to the desired pressure. In such a system the current is set to the desired value and deviations in pressure cause displacements of an armature and sensing element to initiate corrections. However, since electromagnetic windings are nonlinear devices, changes in pressure will not cause proportional changes in the position of the armature. That is, a small change in pressure will cause a certain displacement, but a larger change in pressure may not cause a correspondingly larger change in the position of the armature. The system would have an exaggerated tendency to "hunt." To overcome this difficulty, we provide a system arranged so that the sensing element is operated about a null, and the effects due to the nonlinearity of the winding and the sensing structure are overcome.

One object of our invention is to provide an improved manostat for regulating pressure with a high degree of accuracy.

Another object of our invention is to provide an improved manostat in which the pressure to be regulated is balanced against the electromagnetic pull of a winding in which the sensing element is operated about a null to initiate corrections which are highly uniform, despite the nonlinearity of the elements.

A further object of our invention is to provide an improved manostat employing the feed-back principle wherein the sensing element itself is arranged so as to be responsive to the correction initiated and prevent hunting.

Other and further objects of our invention will appear from the following description.

In general our invention contemplates the use of a bellows, responsive to the desired pressure, mounted in a housing. The force exerted by this bellows is resisted by the electromagnetic pull of a winding which is supplied with the proper balancing current. We arrange a sensing element to cooperate with the winding so that the sensing element operates about a null and the armature and bellows are always initially in the same position, regardless of the desired pressure. When a deviation in pressure occurs, a signal is initiated which operates a valve to bring the pressure in the system back to the desired value.

In the accompanying drawings which form part of the instant specification and which are to be read in conjunction therewith and in which like reference numerals are used to indicate like parts in the various views:

Figure 1 is a diagrammatic view of a manostat showing one embodiment of our invention.

Figure 2 is a sectional view on an enlarged scale taken along the line 2—2 of Figure 1.

More particularly, referring now to the drawings, we mount a bellows 12 in a housing 10 so that the bellows is responsive to variations in pressure within the housing. Bellows 12 may be evacuated to any appropriate degree if desired. A passage 14 leads from the system to be controlled to the chamber or housing 10. Mounted on the base of the bellows 12 by means of a bracket 20 is a support 16 of nonmagnetic material carrying a winding 18. The core 22 of an electromagnet may be a permanent magnet if desired, but preferably it is magnetized to a predetermined degree by a winding 24 disposed about its central pole 26 and energized by a current from battery 28 flowing through rheostat 30.

We pivotally mount an armature 32 on the chamber wall at pivot 34 and attach it to bracket 20 by means of a pin 36 so that the end 38 of the armature is positioned adjacent an E-transformer 40. The E-transformer is slidably mounted in a slot 42 formed in the side of housing 10, as is shown in Figure 2. A rod 44 is rotatably mounted in the E-transformer and extends upwardly through the wall of the housing and through appropriate sealing means. The end of this shaft 44 is threaded and carries a nut 46 which bears on the top of the housing. The position of the E-transformer may be varied by turning the nut 46 to slide the transformer up or down in slot 42. This adjustment enables us readily to zero our manostat.

An alternator 50 connected across conductors 52 and 54 provides the excitation for central pole winding 48 of the E-transformer. The upper and lower pole windings 56 and 58 of the E-transformer are oppositely wound and connected in series. Since these windings are oppositely wound, they will produce voltages which are 180 degrees out of phase with each other and added by the series connection. The resultant difference between the two voltages appears across conductors 60 and 62. Conductor 60 is connected to the cathode 64 of a thermionic tube 66, and the conductor 62 is connected to the grid 68 of this tube so that we impress the resultant difference in the voltages induced in windings 56 and 58 on the grid of tube 66. The plate 70 of tube 66 is connected through a resistor 72 to a source of positive potential 74. The output of tube 66 in turn is fed to an amplifier tube 76. It is to be understood, of course, that we may employ any number of amplifying tubes to obtain increased sensitivity and therefore increased accuracy. The output of amplifier 76 is impressed across the primary winding of a transformer indicated generally by 78, and the output of the transformer appears across the winding 80 of a reversible two-phase motor, indicated generally at 81. We choose the parameters of the circuit between conductors 60 and 62 and winding 80 such that the voltage across winding 80 is 90 degrees out of phase with the voltage across conductors 60 and 62. The voltage supplied by alternator 50 is also impressed across winding 84 of the two-phase motor 81.

The current to winding 18 on support 16 is supplied from a direct current source, the positive terminal of which is indicated at 86. We also provide this circuit with an appropriate indicator 88 which can be calibrated in the desired pressure units and operatively connected in series with a variable resistor 90. By adjustment of resistance of resistor 90, the current in winding 18 and thus its electromagnetic pull is varied. As the resistance is varied, the reading on indicator 88 changes so as to indicate the desired pressure.

Rotor 82 of the two-phase motor 81 is linked by means generally indicated at 92 to a valve V in pipe 94 which is connected to pipe 14 of the system to be controlled. A pump P, driven by a motor M, supplies the pipe 94 with fluid pressure and may be either a pressure pump or a vacuum pump, depending on whether the system is to be maintained above or below atmospheric pressure. It is to be understood that any appropriate fluid pressure source, such as a tank of fluid under pressure, may be employed. As deviations in pressure occur, rotor 82 will be rotated so as to further open or close valve V, as required, to provide a proper relationship with a bleeder valve 96 in pipe 94. This bleeder valve 96, of course, provides an opening much smaller proportionally than the opening of valve V such that a balanced relationship between the flow through valve V and the flow through valve 96 is maintained when the system is at the desired pressure.

The operation of our improved manostat will now be described in detail. The desired pressure in the system from which pipe 14 leads will compress bellows 12 to a certain extent. An equal and opposite force to that of the desired pressure will be exerted by support 16 by virtue of the current flowing through winding 18. Resistor 90 is adjusted until indicator 88 reads the desired value. The system can be set to any desired pressure by adjusting resistor 90 so that indicator 88, calibrated in the proper pressure units, reads the desired value. Should the pressure in the system be other than the desired value, bellows 12 compresses or expands, and armature 32 moves up or down with relation to E-transformer 40. Assuming the system to be in balance, armature 32 is centrally located with respect to the E-transformer 40. Therefore, equal but opposite voltages will be induced in windings 56 and 58 and no resultant voltage will appear on the grid 68 of tube 66. As a result, there will be no voltage across winding 80 of two-phase motor 81, and the rotor 82 will not be rotated. Assuming, for example, that the system is a pressure system and the pressure is greater than the desired value, bellows 12 compresses, and armature 32 moves so that its end 38 is closer to leg 56 than to the leg 58. Therefore, a greater voltage is induced in winding 56 than in winding 58, and the difference between the voltages on 56 and 58 appears on the grid of tube 66, is amplified by tube 76 and finally appears on winding 80 of two-phase motor 81. The voltage across winding 80 will, however, as pointed out above, shift 90 degrees in phase in passing through the network. Since it has so shifted, it will lag or lead by 90 degrees the voltage on winding 84, supplied by alternator 50, and rotor 82 will rotate in a direction to actuate valve V through linkage 92 in such a direction as to partially close valve V and allow the excess pressure to dissipate through bleeder valve 96. As soon as the pressure in the system drops, bellows 12 begins expanding, armature 32 comes nearer to its null position and thus the signal on grid 68 decreases, the excitation on winding 80 decreases and the correction is gradually reduced to zero.

In the event that the pressure in the system is too low, bellows 12 expands and initiates a correction such that rotor 82 rotates in an opposite direction and further opens valve V so that pump P provides additional pressure, assuming, of course, pump P to be a pressure pump. If the system is to be maintained below atmospheric, P will be a vaccum pump and the corrections merely act in the opposite direction. This is accomplished by reversing the leads 60 and 62 so that conductor 60 will be connected to grid 68 and lead 62 to cathode 64.

It should be noted particularly that we have arranged our system so as to overcome the effects of the nonlinearity inherent in magnetic circuits and the bellows. As soon as a correction is initiated by displacement of the sensing element 32, our construction acts to bring the pressure in the system back to normal. Since the correction immediately affects the pressure in the housing, sensing element 32 responds to the correction. That is, the correction initiated by element 32 is fed back into the system. If the displacement due to a deviation from desired pressure is too large, the correction initiated will be too large. Since element 32 is responsive to the correction, it will be returned to the null point rapidly and the correction will be rapidly reduced so that the sensing element will not overrun the null. If the correction is too small, element 32 will not return to the null until the system is at the desired pressure.

It will be seen that we have accomplished the objects of our invention in providing an extremely accurate manostat in which the force exerted by the system to be controlled is balanced against the electromagnetic pull of a winding. The sensing element of our manostat is arranged to operate about a null so that inaccuracies resulting from the non-linearity of the system components are minimized. We have employed the feed-back principle to reduce the tendency of the system to hunt. The effect of non-linearity in the bellows, nonuniformity in magnets and unequal distribution of magnetic flux and hysteresis are eliminated. Likewise, the effect of operating the magnetic system at different values of current is eliminated. We simply set the indicator to the desired pressure and the system is automatically controlled with a minimum of error.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A manostat comprising in combination a housing, means providing communication between the housing and a fluid pressure system to be regulated to a desired pressure, a bellows mounted in said housing, a magnet having a magnetic field mounted on said housing, a winding supported by said bellows and positioned in said magnetic field, means for energizing said winding to a degree corresponding to said desired pressure, an armature pivotally mounted on said housing and connected to said winding for movement therewith, sensing means mounted on said housing adjacent to said armature, means responsive to displacement of the armature with respect to the sensing means for producing a signal corresponding to the direction of displacement, a fluid pressure source, a pipe providing communication between the fluid pressure source and the fluid pressure system, a valve connected in said pipe for controlling said communicating pipe, and means responsive to said signal for actuating said valve to return the system to the desired pressure.

2. A manostat as in claim 1 wherein said magnet is an electromagnet and means for controlling the excitation of said electromagnet.

3. A manostat as in claim 1 wherein said sensing means is an E-transformer and means for exciting the center winding of said E-transformer, the outer legs of said E-transformer having oppositely wound, series-connected windings thereon.

4. A manostat as in claim 1 wherein said sensing means is an E-transformer and means for adjusting the position of said E-transformer with respect to said armature.

5. A manostat as in claim 1 wherein said means responsive to the displacement of the armature includes an amplifying circuit.

6. A manostat as in claim 1 wherein said means responsive to the signal includes a reversible electric motor, said motor being linked to said valve means.

7. A manostat as in claim 1 including a bleeder duct communicating with the pressure system and a bleeder valve connected in said bleeder duct for controlling the bleeder duct.

8. A manostat as in claim 1 wherein said fluid pressure source is a vacuum pump.

9. A manostat as in claim 1 wherein said fluid pressure source is a pressure pump.

10. A manostat as in claim 1 including indicator means operatively associated with said means for energizing the winding, said indicator means being calibrated in pressure units.

References Cited in the file of this patent

UNITED STATES PATENTS

| | | |
|---|---|---|
| 2,112,682 | Ryder | Mar. 29, 1938 |
| 2,118,842 | Grebe | May 31, 1938 |
| 2,219,147 | Binder | Oct. 22, 1940 |
| 2,251,149 | Merckel | July 29, 1941 |
| 2,299,529 | Crampton | Oct. 20, 1942 |
| 2,597,892 | Nash | May 27, 1952 |
| 2,688,253 | Markson | Sept. 7, 1954 |
| 2,694,927 | Coulbourn | Nov. 23, 1954 |

FOREIGN PATENTS

| | | |
|---|---|---|
| 781,793 | France | Mar. 4, 1935 |